(12) United States Patent
Mailänder

(10) Patent No.: US 6,966,183 B2
(45) Date of Patent: Nov. 22, 2005

(54) SUPERCHARGED INTERNAL COMBUSTION ENGINE

(75) Inventor: Udo Mailänder, Bietigheim-Bissingen (DE)

(73) Assignee: Udo Mailänder GmbH, (DE)

(*) Notice: Subject to any disclaimer, the term of this patent is extended or adjusted under 35 U.S.C. 154(b) by 262 days.

(21) Appl. No.: 10/632,935

(22) Filed: Aug. 1, 2003

(65) Prior Publication Data
US 2004/0020205 A1    Feb. 5, 2004

(30) Foreign Application Priority Data
Aug. 3, 2002    (DE) ................ 102 35 701

(51) Int. Cl.$^7$ ............... F02B 33/44; F02B 37/00; F02B 37/14; F02B 37/22
(52) U.S. Cl. ........................................ 60/612
(58) Field of Search ............ 60/611, 612; 123/526, 123/565

(56) References Cited

U.S. PATENT DOCUMENTS

| | | | |
|---|---|---|---|
| 4,228,655 A | 10/1980 | Herschmann et al. | 60/612 |
| 4,453,381 A | 6/1984 | Dinger | 60/612 |
| 4,570,442 A * | 2/1986 | Deutschmann et al. | 60/612 |
| 5,577,385 A * | 11/1996 | Kapich | 60/612 |
| 6,158,219 A * | 12/2000 | Mailander | 60/612 |
| 6,279,320 B1 * | 8/2001 | Mailander | 60/612 |
| 6,637,205 B1 * | 10/2003 | Ahmad et al. | 60/611 |
| 6,694,736 B2 * | 2/2004 | Pfluger | 60/612 |
| 6,889,503 B2 * | 5/2005 | Hoecker et al. | 60/612 |
| 2001/0054287 A1 * | 12/2001 | Hoecker et al. | 60/612 |
| 2004/0020205 A1 * | 2/2004 | Mailander | 60/612 |

FOREIGN PATENT DOCUMENTS

| | | | |
|---|---|---|---|
| DE | 3443324 C1 * | 8/1986 | F02B 37/14 |
| DE | 40 40 939 | 4/1992 | |
| EP | 0492272 | 7/1992 | |
| GB | 815387 | 6/1956 | |
| WO | WO 99/17008 | 4/1999 | |

* cited by examiner

*Primary Examiner*—Sheldon J Richter
(74) *Attorney, Agent, or Firm*—Robert W Becker & Associates; Robert W Becker

(57) ABSTRACT

A supercharged internal combustion engine is provided having a common exhaust manifold and a common combustion air manifold for all engine cylinders. The engine has a plurality of exhaust-driven superchargers that are staggered as a function of the engine output. Each supercharger is engageable or disengageable with the exhaust manifold via its exhaust-driven turbine. Each supercharger, at an input side of its compressor, has a line connection, via a respective valve mechanism, to the output of a charging fan disposed upstream and in series with the compressor. For an oppositely directed changeover between supply air compressed by the charging fan, and ambient air, all of the valve mechanisms are adjusted as a function of the speed of an associated supercharger and a combustion air operating pressure. A processor having a stored requirements profile is provided for the sole release of the valve mechanism of a given supercharger.

7 Claims, 1 Drawing Sheet

SUPERCHARGED INTERNAL COMBUSTION ENGINE

BACKGROUND OF THE INVENTION

The present invention relates to a supercharged internal combustion engine having a common exhaust manifold and a common combustion air manifold for all combustion chambers. The engine also has a plurality of exhaust-driven superchargers that are staggered as a function of the output of the internal combustion engine, wherein the superchargers are engageable or disengageable with the exhaust manifold via their exhaust-driven turbine. The engine also has a charging fan that is driven by a separate motor and that is disposed upstream and in series with the compressor of one of the superchargers.

With the aid of the supercharging, it is possible to realize in a small internal combustion engine the output of an otherwise considerably larger internal combustion engine. In the case of a prescribed rated output, the engine can be considerably smaller due to its supercharging. During the supercharging of internal combustion engines having exhaust-driven superchargers, there results the conflicting objectives that on the one hand due to the supercharging an increase of the rated output is possible, and on the other hand for this purpose the geometrical/mechanical compression must be proportionally reduced relative to the desired increase in rated output. Due to the reduction of the geometrical/mechanical compression, however, the output or torque of the supercharged internal combustion engine drops in an over-proportional manner in the lower speed range, which is attributable to the operating speed plot of the output curve, which for exhaust-driven superchargers is very steep. A fluid-producing mechanism can bring about an optimal flow, and hence a high output, only within a very narrow speed range. This is the opposite of the desire in internal combustion engines of land vehicles for the production of a propulsion hyperbola. However, by the use of a plurality of exhaust-driven superchargers, not only the operating speed range of the internal combustion engine, but also the special volumetric operating size of the exhaust-driven superchargers, can be divided. However, the resulting, chronologically offset engagement of the superchargers easily leads the supercharging system into the range of the pumping and to the collapse of the combustion air flow in the compressor that is to be engaged if, for example, the air, which initially flows from the second compressor at very low pressure via a discharge valve into the atmosphere, is intended to pass into the combustion air manifold of the internal combustion engine that is already under the full pressure of the first compressor, in other words from a flow-producing mechanism having a relatively high flow velocity and little possibility for building up pressure to a reciprocating engine having relative low flow velocity and a relatively high possibility for building up pressure.

Mechanical positive-displacement chargers, which can be driven by the internal combustion engine itself or by a separate motor, easily convey the air required for idling of the internal combustion engine, but in the high output/high speed range of the internal combustion engine cannot compete with an exhaust-driven supercharger. Therefore, it is customary on an internal combustion engine to combine the respective advantages of an exhaust-driven supercharger and a positive-displacement compressor by a series connection or a parallel connection of the two chargers. This is particularly applicable for counteracting the so-called turbo hole or leak, which results when upon start-up of the internal combustion engine, a single or first exhaust-driven supercharger comes only slowly up to speed due to the slowly increasing generation of exhaust gas.

A supercharged internal combustion engine of the aforementioned type is known from the publication DE 40 40 939 C1. With this internal combustion engine, as a separate motor for the preliminary blower, and as the main motor, a respective rotary piston diesel engine having a low compression is used, with greatly unequal output dimensioning for the main motor and the smaller preliminary blower motor; for the drive of the preliminary blower, an electrical starter motor is additionally provided. From an output signal of the main motor, at least one two-stage exhaust-driven turbo charger is connectable parallel to the series connection of the preliminary blower and of the charging blower that is driven by the exhaust-driven turbine. In this way, the preliminary blower motor can be reduced in size in conformity with its proportional contribution to the charge output. With a connectability of merely one two-stage exhaust-driven turbo charger, the necessary size of the preliminary blower motor can be cut in half, and with the staggered connectability of two two-stage exhaust-driven turbo chargers, the necessary size of the preliminary blower motor can be one third. The so-called pumping during the chronologically offset additional connection of exhaust-driven turbo chargers is not addressed. However, a loss of compressed air from the region of the combustion air manifold due to a backward flowing of combustion air in each of the exhaust-driven turbo chargers that is to be connected or engaged is to be avoided. This is particularly applicable to diesel engines having a pressure threshold that is critical for its spontaneous ignition.

It is an object of the present invention, for a supercharged internal combustion engine, in conjunction with an increase of output, to provide an improved acceleration characteristic in the starting range, and a transition-harmonic operating spectrum from very low speed at partial load and full throttle up to high speed at partial load and full throttle, and to enable a staggered engagement and disengagement of exhaust-driven superchargers without the aforementioned pump effect.

BRIEF DESCRIPTION OF THE DRAWING

This object, and other objects and advantages of the present invention, will appear more clearly from the following specification in conjunction with the single schematic drawing, which is a block diagram illustrating one exemplary embodiment of an inventive supercharged internal combustion engine.

SUMMARY OF THE INVENTION

Figure 1:
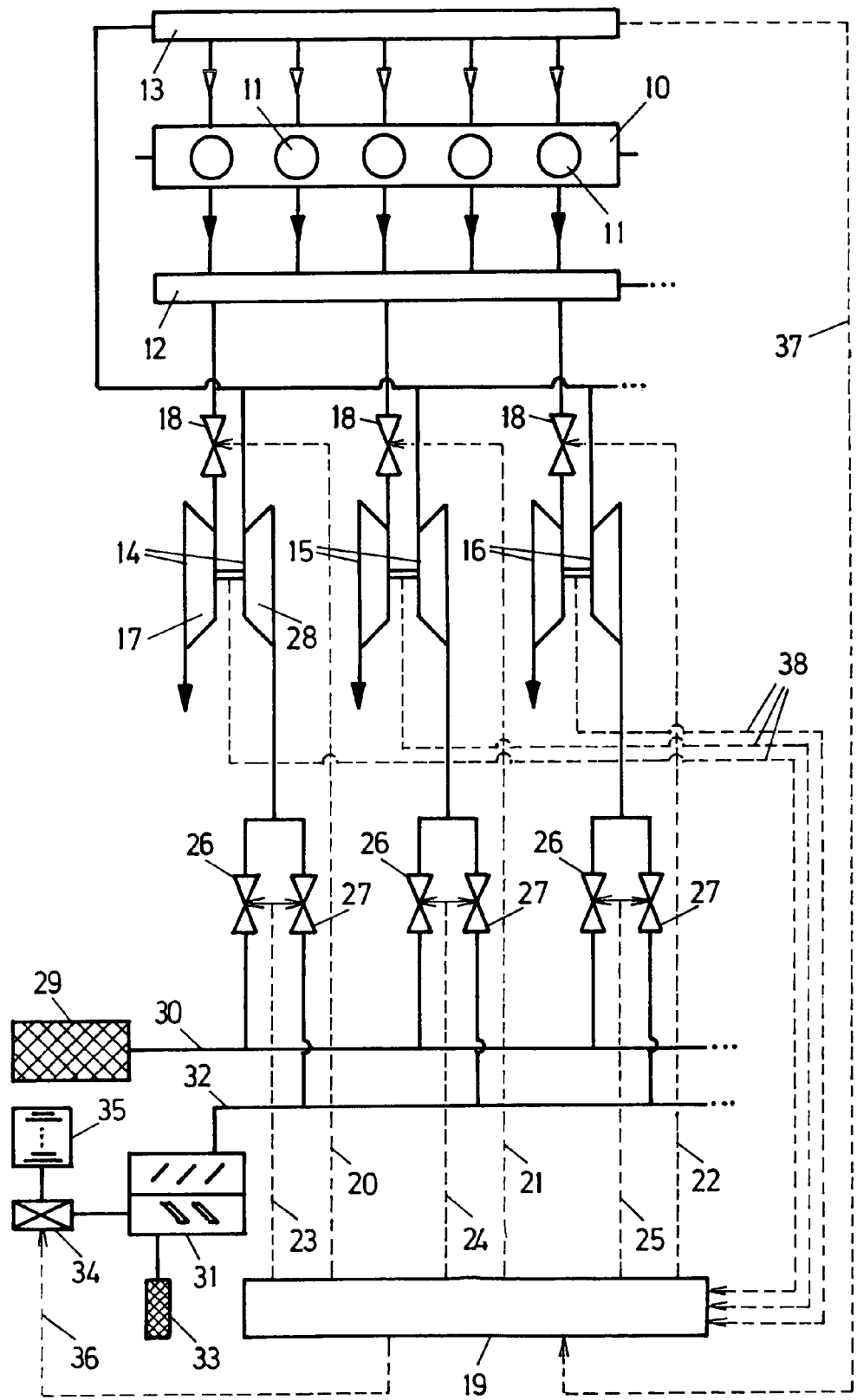

The object of the invention is realized in a supercharged internal combustion engine in that all of the exhaust-driven superchargers, at the input side of their compressors, have a line connection to the output of the charging fan via a respective valve mechanism; also provided is a computer or a similar processing means having a stored requirements profile for the sole release of the valve mechanism of a given one of the superchargers that is to be engaged in a staggered operation, and wherein for an oppositely directed changeover between the supply air compressed by the charging fan and the ambient air, all of the valve mechanisms are adjusted as a function of the speed of their supercharger and the combustion air operating pressure.

In this way, the charging fan is no longer used only for counteracting the so-called turbo leak during start-up of the internal combustion engine, and for the combination of the advantages of a positive-displacement charger with those of a flow charger, but rather also to secure the forward flow in each of the exhaust-driven superchargers, which are to be additionally connected in a chronologically offset manner. In particular with a fine division of the operating spectrum of the internal combustion engine by means of numerous exhaust-driven superchargers, one can get by not only with a smaller overall size of the superchargers, but at the same time with a smaller charging fan. As a separate motor of the small charging fan, an electric motor can be used that derives its drive energy from an electrical vehicle battery. Such a motor reacts and starts more rapidly than does an internal combustion engine or a gear linkage to the main motor that is to be supercharged. In conformity therewith, the time interval in which the supply air compressed by the charging fan is pressed through the respective supercharger is shortened. The advantages achieved with the present invention, however, also consist in particular in that due to the division of the operating spectrum of the internal combustion engine via the superchargers during the operation of a motor vehicle, one can eliminate a number of gear change steps, in that the sequence of the exhaust-driven superchargers in their staggered placement into operation can be easily changed with regard to a uniform wear, and in that a disruption in one of the superchargers can be bypassed by a pre-programmed factoring thereof.

Further specific features of the present invention will be described in detail subsequently.

DESCRIPTION OF PREFERRED EMBODIMENTS

Referring now to the drawing in detail, shown as an internal combustion engine 10 is a five-cylinder engine in order to indicate that with the supercharging arrangement there is no conceptual limitation on the number of the cylinders 11 that are to be supplied with combustion air. The dotted line extensions on both the exhaust manifold 12 of the internal combustion engine 10 and on the charge or combustion air manifold 13 of the engine 10 are intended to indicate that in addition to the three symbolically indicated exhaust-driven super-chargers 14, 15 and 16, a number of further staggered engageable and disengageable superchargers can also be provided for dividing the operating spectrum of the internal combustion engine 10. In practice, one would generally limit oneself to six to ten identical superchargers, which represents a compromise between the fineness of the division of the operating spectrum of the internal combustion engine 10 and the capital outlay for the supercharging arrangement of the engine 10.

The combustion air flows to the cylinders 11 of the internal combustion engine 10 are indicated by light arrowheads, and the exhaust gas flows are indicated by dark arrowheads. Disposed between the exhaust manifold 12 of the internal combustion engine 10 and the exhaust-driven turbine 17 of each exhaust-driven supercharger 14, 15, 16, etc, is an exhaust gas valve 18 which is individually controllable by the computer or similar processor 19, which is provided with a stored requirements profile. In the drawing, the pertaining control lines 20, 21 and 22 are represented by dashed lines. Further control lines 23, 24 and 25 of the computer 19 lead to the valve mechanisms at the air inlet of the compressor 28 of the exhaust-driven superchargers 14, 15 and 16, which valve mechanisms include an ambient air valve 26 and a supply air valve 27. The exhaust gas valve 18, just like the ambient air valve 26 and the supply air valve 27, is preferably embodied as a proportional valve in order to keep a broad control range available. Within each valve mechanism, the ambient air valve 26 and the supply air valve 27 thereof are coupled with one another in such a way that the ambient air valve 26 opens when the supply air valve 27 closes, and vice versa, the ambient air valve 26 closes when the supply air 27 opens. All of the ambient air valves 26 have a common supply line 30, which comes from an air filter 29, whereas all of the supply air valves 27 are integrated into the connecting line 32, which leads to the output of the charging blower or fan 31.

The charging fan 31, which is provided at the input side with its own air filter 33, is driven by a relatively small electric motor 34, which in turn derives its drive energy from an electric vehicle battery 35. In this connection, one should bear in mind that the electric motor 34, which is similarly engageable and disengageable by the computer 19 via the control line 36, is always activated for only a short period of time until a backward flow of combustion air via the respectively to be added supercharger is precluded. In the periods of non-operation of the charging fan 31 during the operation of the internal combustion engine 10, the vehicle battery 35 can be easily recharged by a generator connected to the internal combustion engine 10. In addition, in the meantime very high-capacity vehicle batteries are available, so that even with very large internal combustion engines 10, the starting weakness of an additionally engaged supercharger 14, 15 or 16 can be compensated for extremely rapidly by the charging fan 31.

The computer 19, which is provided with a stored requirements profile, receives pressure signals from the combustion air manifold 13 via the signal line 37, and speed signals from the superchargers 14, 15, 16, etc. via the signal lines 38, whereby all of the valve mechanisms 26, 27, for the oppositely directed changeover between the supply air, which is compressed by the charging fan 31, and the ambient air, are adjusted as a function of the speed of their exhaust-driven supercharger and the combustion air operating pressure.

The operation of the charging fan 31 via the computer 19 during the acceleration of the internal combustion engine 10 is preferably limited to a starting range of the respectively pertaining supercharger 14, 15, 16, etc. in the sequence of all staggered and activated superchargers, which protects the charging fan 31 and relieves the electrical vehicle battery 35. For stabilization of the constant pressure desired in the combustion air manifold 13 by reducing abrupt disengagement processes, during slowing-down of the internal combustion engine 10 the operation of the charging fan 31 is additionally limited by the computer 19 to one respectively pertaining supercharger 14, 15, 16 etc. in the switching sequence of all staggered and activated superchargers.

The advantages of the described supercharging arrangement are particularly evident when the internal combustion engine 10 is embodied as a Diesel engine having a compression that is greatly reduced to about 8:1. The actual internal combustion engine 10 can then be greatly reduced in size while maintaining the same power. The numerous exhaust-driven superchargers 14, 15, 16, etc. easily produce the relatively high missing charging weight, whereby the charging fan 31, which is used in an expanded function as combustion air support, and operates as a displacement compressor, can similarly be considerably reduced in size.

The specification incorporates by reference the disclosure of German priority document 102 35 701.3 filed 3 Aug. 2002.

The present invention is, of course, in no way restricted to the specific disclosure of the specification and drawing, but also encompasses any modifications within the scope of the appended claims.

I claim:

1. A supercharged internal combustion engine, comprising:
   a common exhaust manifold and a common combustion air manifold for all combustion chambers of cylinders of said internal combustion engine;
   a plurality of exhaust-driven superchargers that are staggered as a function of the output of said internal combustion engine, wherein each of said superchargers has an exhaust-driven turbine via which said supercharger is engageable or disengageable with said exhaust manifold, and wherein each of said superchargers has a compressor;
   a charging fan, wherein said charging fan is disposed upstream of and in series with the compressor of one of said superchargers, wherein each of said superchargers, at an input side of its compressor, has a line connection, via a respective valve mechanism to an output of said charging fan, and wherein all of said valve mechanisms, for an oppositely directed changeover between supply air compressed by said charging fan, and ambient air, are adjusted as a function of a speed of an associated supercharger and a combustion air operating pressure;
   a separate motor for driving said charging fan; and
   a processing means having a stored requirements profile for the sole release of the valve mechanism of a given one of said superchargers that is to be engaged in a staggered operation.

2. An internal combustion engine according to claim 1, wherein during acceleration of said engine, operation of said charging fan is limited by said processing means to a starting range of a respective one of said superchargers in a switching sequence of all staggered and activated superchargers.

3. An internal combustion engine according to claim 2, wherein during slowing-down of said engine, operation of said charging fan is limited by said processing means to a range, corresponding to the starting range, of the pertaining supercharger in the switching sequence of all staggered and activated superchargers.

4. An internal combustion engine according to claim 1, wherein a respective exhaust gas valve, which is controllable by said processing means, is associated with each of said superchargers for individual placement into operation thereof, and wherein said exhaust gas valve, as well as said valve mechanism, is embodied as a proportional valve.

5. An internal combustion engine according to claim 1, wherein for a uniform staggering of an operating range of said engine, six to ten identical superchargers are provided.

6. An internal combustion engine according to claim 1, wherein said separate motor for driving said charging fan draws drive energy from an electrical vehicle battery.

7. An internal combustion engine according to claim 1, which is embodied as a Diesel engine having a compression that is greatly reduced to about 8:1.

* * * * *